(12) United States Patent
Miyawaki et al.

(10) Patent No.: US 12,080,862 B2
(45) Date of Patent: Sep. 3, 2024

(54) METHOD FOR SEPARATING MEMBERS THAT WERE PREVIOUSLY JOINED

(71) Applicant: HONDA MOTOR CO., LTD., Tokyo (JP)

(72) Inventors: Akiyoshi Miyawaki, Saitama (JP); Mitsuru Sayama, Saitama (JP); Taichi Kurihara, Saitama (JP); Hiroyuki Nakai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 307 days.

(21) Appl. No.: 17/677,314

(22) Filed: Feb. 22, 2022

(65) Prior Publication Data

US 2022/0320620 A1    Oct. 6, 2022

(30) Foreign Application Priority Data

Mar. 30, 2021 (JP) ................................. 2021-057225

(51) Int. Cl.
*H01M 10/54* (2006.01)
*B23P 19/04* (2006.01)

(52) U.S. Cl.
CPC ............. *H01M 10/54* (2013.01); *B23P 19/04* (2013.01)

(58) Field of Classification Search
CPC ........................................................ B23P 19/04
See application file for complete search history.

(56) References Cited

U.S. PATENT DOCUMENTS

2011/0131784 A1*  6/2011  de Traglia Amancio Filho .......... B29C 66/21
                                                                                29/428

FOREIGN PATENT DOCUMENTS

| CN | 107470773 A | * | 12/2017 | ........... B23K 20/125 |
| CN | 109967856 A | * | 7/2019 | |
| CN | 111299805 A | * | 6/2020 | ......... B23K 20/1245 |
| DE | 102015213633 B3 | * | 11/2016 | |
| EP | 3061558 A1 | * | 8/2016 | ........... B23K 20/124 |
| JP | 2004058135 A | * | 2/2004 | ......... B23K 20/1255 |
| JP | 2007054848 A | | 3/2007 | |
| JP | 2012160318 A | | 8/2012 | |
| WO | WO-2007119343 A1 | * | 10/2007 | ......... B23K 20/1255 |

OTHER PUBLICATIONS

Machine translation JP2004058135 (Year: 2004).*
Machine translation EP3061558A1 (Year: 2016).*
(Continued)

*Primary Examiner* — Jacob T Minskey
*Assistant Examiner* — Wayne K. Swier
(74) *Attorney, Agent, or Firm* — Armstrong Teasdale LLP

(57) ABSTRACT

Disclosed is a method for separating a first member (1) and a second member (2) joined to each other comprising the steps of placing a clamp ring (14) on the surface of the first member, plunging a rotating probe (17) having a screw thread on a peripheral surface thereof into the surface of the first member through a through hole (10) of the clamp ring until a tip end of the probe reaches beyond an interface between the first member and the second member, the screw thread being directed so as to lift material of the bonded part away from the second member as a lifted part. The two members can be rejoined to each other by collapsing the lifted part into a bonded part once again by using a rotating probe and a clamp ring.

4 Claims, 11 Drawing Sheets

(56) References Cited

OTHER PUBLICATIONS

Machine translation CN107470773A (Year: 2017).*
Machine translation CN111299805A (Year: 2020).*
Machine translation JP2004058135A (Year: 2004).*
Machine translation WO2007/119343A1 (Year: 2007).*
Machine translation DE102015213633B3 (Year: 2016).*
Machine translation CN109967856A (Year: 2019).*

* cited by examiner

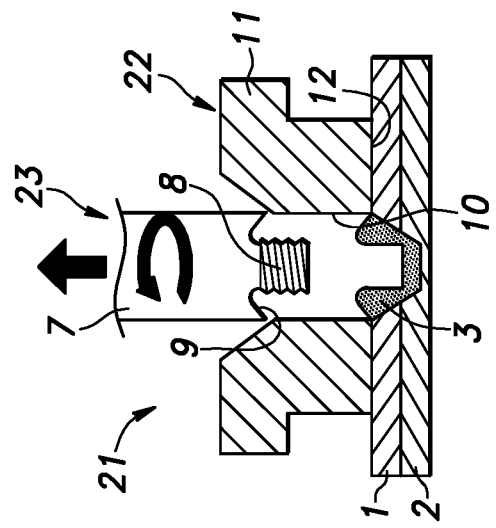
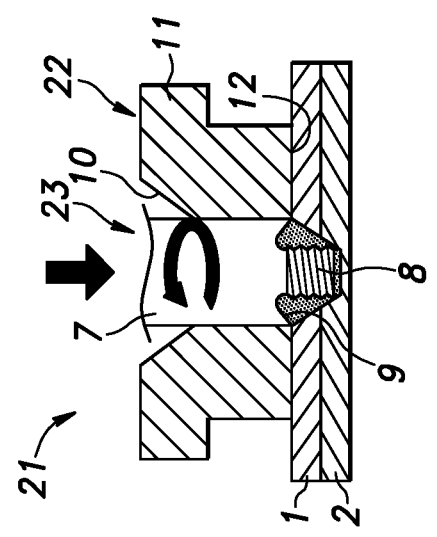
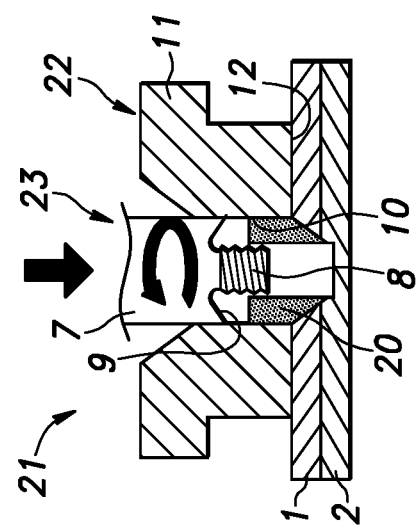

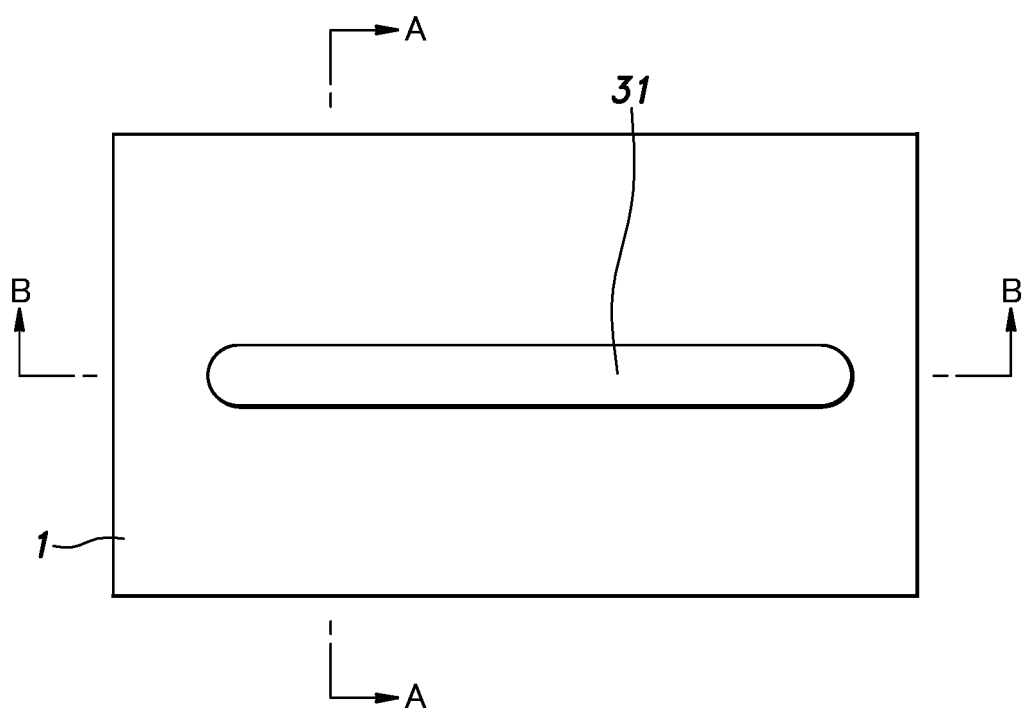

METHOD FOR SEPARATING MEMBERS THAT WERE PREVIOUSLY JOINED

TECHNICAL FIELD

The present disclosure relates to a method for separating a plurality of members that were previously joined to each other. The present disclosure further relates to a method for rejoining the members that were previously separated from each other by using this separating method.

BACKGROUND ART

Friction stir welding is known in the art as a method in which a rotating tool is pressed against a pair of mutually overlapping members so that the material of the members adjacent to the rotating tool is plastically stirred and displaced by frictional heat, and a bonding portion is created between the members. This method can be practiced either as a spot welding for joining the members at a single spot, or a line welding for joining the members along a line. In the former case, while the spot welding is being performed at each spot, the rotating tool is kept stationary at the single spot. In the latter case, the rotating tool is moved along the line relative to the members to be joined.

JP2012-160318A discloses the use of a pin (probe) having a screw thread on the outer circumferential surface thereof so that the plastically fluid material created by friction is pushed forward. JP2007-54848A discloses a method for separating two members which were previously joined to each other by friction stir welding. According to this prior art, the two members which were joined to each other by friction stir welding is subjected to a heat treatment in the atmosphere to create an intermetallic compound layer between the two members. The intermetallic compound layer is relatively brittle so that the two members can be separated from each other relatively easily.

Oftentimes, two members that are firmly joined to each other are desired to be separated from each other for inspection, repair, maintenance, recycling and other purposes. In some applications, the members that are thus separated from each other in this manner are desired to be rejoined to the original state once again. JP2012-160318A does not disclose any convenient way to separate the members away from each other once the two members are joined to each other. The technology disclosed in JP2007-54848A requires a relatively time-consuming heat treatment for separating the two members. Further, the parts adjoining the joined part are inevitably subjected to the thermal influences of the heat treatment, and this prevents the application of this process to objects which contain sensitive components in adjoining regions. Further, a significant force is still required to separate the members even after the heat treatment, and once separated from each other, the separated members become unsuited to be rejoined to each other at the original joined portion due to the permanent thermal influences caused by the heat treatment.

BRIEF SUMMARY OF THE INVENTION

In view of such problems of the prior art, a primary object of the present invention is to provide a method for separating members that were previously joined to each other. A certain aspect of the second object of the present invention further provides a method for rejoining the members that were previously separated from each other by the separating method according to the present invention.

To achieve such objects, the present invention provides a method for separating a first member (1) and a second member (2) joined to each other at a bonded part (3) away from each other, comprising the steps of: placing the first member and the second member on a worktable with the first member facing away from the worktable; placing a clamp ring (14) on the surface of the first member, the clamp ring having a contact surface (12) abutting against the surface of the first member and a through hole (10) extending through the contact surface such that the through hole of the clamp ring aligns with the bonded part; plunging a separating rotating tool (15) including a probe (17) having a screw thread on a peripheral surface thereof into the surface of the first member through the through hole of the clamp ring, the screw thread being directed so as to lift material of at least a part of the bonded part away from the second member as a lifted part (20); lifting the probe along with the clamp ring away from the surface of the first member; and separating the first member and the second member away from each other. Since the bonded part is lifted away from the second member, and ceases to contribute to the joining of the two members, the first member can be easily separated from the second member. Further, since the heat generated during the separation process is the frictional heat owing to the rotation of the probe, the heat does not significantly adversely affect the first member and the second member so that the first member and the second member can be reused and rejoined as required without any problem. Further, the bonded part may be substantially entirely converted into the lifted part so that no debris is created by the separating process so that no cleaning is required during or after the separating process.

Preferably, the probe is plunged into the surface of the first member until a tip end of the probe reaches beyond an interface between the first member and the second member. Thereby, the two members can be separated from each other in a favorable manner.

The separating process may take place at a spot joining. In case of a spot separating process, the separating rotating tool further includes a main body (16) having a larger outer diameter than the probe, and connected to a base end of the probe in a coaxial relationship so as to define an annular shoulder surface (18) by a part of the main body adjoining the base end of the probe so that the lifted part is received in an annular space defined by the shoulder surface, the peripheral surface of the probe, and an inner peripheral surface of the through hole in the step of plunging the separating rotating tool. Thereby, the lifted part is formed so as to include a tubular projection projecting away from the surface of the first member. As a result, the bonded part is substantially entirely displaced into the annular space, and converted into the tubular projection so that no debris is created in a reliable manner.

Preferably, the annular shoulder surface of the separating rotating tool is flat. Thereby, the tubular projection can be formed in a favorable manner.

According to the present invention, the two members thus separated from each other can be rejoined by further performing the steps of: placing the second member on a worktable, and the first member on the first member in a closely overlying relationship and in a relative position as the two members were originally joined to each other; placing a clamp ring (14) on the surface of the first member, the clamp ring having a contact surface (12) abutting against the surface of the first member and a through hole (10) extending substantially orthogonally to the contact surface such that the through hole of the clamp ring aligns with the lifted part; plunging a rejoining rotating tool (23) including a probe (8) into the surface of the first member through the through hole of the clamp ring so as to push the material of the lifted part (20) toward the second member into a bonded part (3) once again; and lifting the probe along with the clamp ring away from the surface of the first member. Plunging a rotating tool including a probe into the surface of the first member through the through hole of the clamp ring; and lifting the probe along with the clamp ring away from the surface of the first member. Thereby, the lifted part that was created by the previous separating process can be conveniently pushed toward the second member so as to form a bonded part once again so that the two members can be joined to each other as these two members were originally joined without requiring any additional material. Preferably, the rejoining rotating tool is plunged into the surface of the first member until a tip end of the probe extends beyond an interface between the first member and the second member. Thereby, the material of the two members can be favorable stirred, and the two members can be rejoined in a favorable manner. Preferably, the probe is provided with a screw thread on a peripheral surface thereof, the screw thread being directed so as to push the material of the lifted part toward the second member into a bonded part once again. Thereby, the two members can be rejoined in a favorable manner.

Preferably, the rejoining rotating tool (23) further includes a main body (7) having a larger outer diameter than the probe, and connected to a base end of the probe in a coaxial relationship so as to define an annular shoulder surface (9) by a part of the main body adjoining the base end of the probe, the lifted part being collapsed by the annular shoulder, and received in an annular space defined by the shoulder surface, the peripheral surface of the probe, and an inner peripheral surface of the through hole in the step of plunging the rotating tool. By collapsing the lifted part, and using the lifted part as the material for rebuilding the bonded part, the rejoining process can be performed without requiring any extraneous material. Preferably, the shoulder surface of the rejoining rotating tool is concave in shape. Preferably, the probe of the rejoining rotating tool has a greater diameter and a smaller length than the probe of the separating rotating tool. Thereby, the rejoining process can be performed in a particularly favorable manner.

The joining process may also take place as a line joining. In case the bonded part (31) extends from a start point to an end point along the surface of the first member, the method for separating these members may further comprise the step of moving the clamp ring (34) and the probe (35) along the bonded part from one of the ends thereof to the other after the step of plunging the rotating probe and before the step of lifting the probe so as to convert the bonded part into a lifted part (40), the contact surface of the clamp ring being provided with a groove (39) extending from the through hole to an outer periphery of the contact surface and oriented to a trailing direction with respect to movement of the clamp ring.

Thus, the two members that were previously joined along a line can be separated in a favorable manner as was the case where the two members were joined at a spot. The tool for this separation process is similar to that for joining the two members along a line so that no significant investment is required to expand the application of the present invention from a spot joining to a line joining. Again, the bonded part may be substantially entirely converted into the lifted part so that no debris is created by the separating process so that no cleaning is required during or after the separating process.

According to another aspect of the present invention, the two members thus separated from each other can be rejoined along a line by further performing the steps of: placing the second member on a worktable, and the first member on the second member in a closely overlying relationship and in a relative position as the two members were originally joined to each other; placing a clamp ring (34) on the surface of the first member, the clamp ring having a contact surface (38) abutting against the surface of the first member and a through hole (36) extending substantially orthogonally to the contact surface such that the through hole of the clamp ring aligns with one of the ends of the lifted part; plunging a rejoining rotating tool (33) including a probe into the surface of the first member at one of the ends of the lifted part through the through hole of the clamp ring; moving the rotating probe along the lifted part so as to convert the lifted part into the bonded part until the other end of the lifted part is reached, the contact surface of the clamp ring being provided with a groove extending from the through hole to an outer periphery of the contact surface and oriented to a leading direction with respect to movement of the clamp ring; and lifting the probe along with the clamp ring away from the surface of the first member. Thereby, the lifted part that was created by the previous separating process can be conveniently pushed toward the second member so as to form a bonded part once again so that the two members can be joined to each other as these two members were originally joined without requiring any additional material.

Preferably, the rejoining rotating tool is plunged into the surface of the first member until a tip end of the probe extends beyond an interface between the first member and the second member. Thereby, the material of the two members can be favorable stirred, and the two members can be rejoined in a favorable manner. Preferably, the probe is provided with a screw thread on a peripheral surface thereof, the screw thread being directed so as to push the material of the lifted part (20) toward the second member into a bonded part (31) once again. Thereby, the two members can be rejoined in a favorable manner.

Preferably, material of the first member is more deformable than material of the second member.

Since the probe is plunged into the surface of the first member which is more deformable than the second member, the bonded part which is mostly formed by the material of the first member can be favorably plastically stirred and displaced so that the attachment between the two members can be favorably broken, and the two members can be separated from each other with a particularly small force.

Preferably, the first member and the second members are parts of electronic or electric components that are electrically connected to each other. In a particularly favorable application, the first member is a battery terminal, and the second member is a lead terminal.

Thereby, the battery terminal and the lead terminal which may be connected to a user of electric power or a supplier of electric power for recharging can be reliably joined together with minimum electric resistance by friction stir welding, and can be separated and rejoined as required in a convenient and reliable manner.

Thus, the present invention provides a method for separating members that were previously joined to each other in a convenient and reliable manner, and a method for rejoining the members that were previously separated from each other by the separating method according to the present invention in a convenient and reliable manner.

BRIEF DESCRIPTION OF THE DRAWINGS

Now the present invention is described in the following with reference to the appended drawings, in which:

FIG. 3A is a diagram similar to that of FIG. 1A showing a stage of the process of rejoining the two members that were previously separated from each other;

FIG. 3B is a diagram showing another stage of the process of rejoining the two members that were previously separated from each other;

FIG. 3C is a diagram showing yet another stage of the process of rejoining the two members that were previously separated from each other;

FIG. 4 is a plan view showing two overlying members joined to each other along a line;

DESCRIPTION OF THE PREFERRED EMBODIMENTS

Figure 1A:
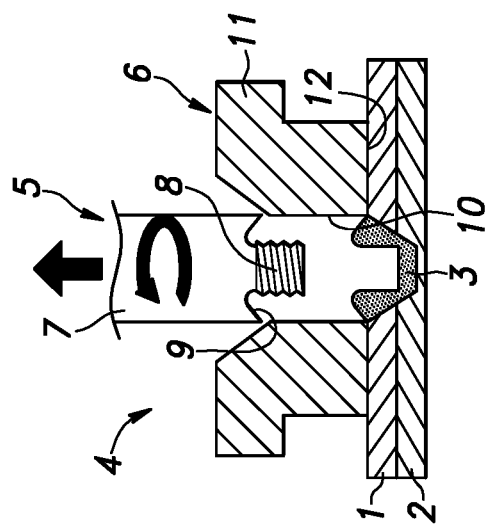
FIG. 1A is a diagram illustrating a stage in the process of joining two members by friction stir welding at a single spot.

Preferred embodiments of the present invention are described in the following with reference to the appended drawings.

FIG. 1 shows a process of joining a first member 1 and a second member 2 each consisting of a plate member to each other via a bonded part 3 formed by friction stir welding. The second member 2 is placed on a worktable having a flat top surface, and the first member 1 is placed on top of the second member 2 in an overlying relationship, and a joining device 4 is applied onto the upper side of the first member 1 as will be described hereinafter. Preferably, the material of the first member 1 is more deformable than that of the second member 2, but is not so limited. In an alternate embodiment of the present invention, the second member 2 is not a plate member, but a member having a substantially large thickness such as a block. Also, three or more members may be jointly bonded to one another at the same time. The possible combinations of the materials for the first member 1 and the second member 2 include, not exclusively, aluminum alloy and aluminum alloy, copper alloy and copper alloy, iron alloy and iron alloy, aluminum alloy and iron alloy, aluminum alloy and copper alloy, aluminum alloy and carbon fiber reinforced plastic, aluminum alloy and glass fiber reinforced plastic, magnesium alloy and iron alloy, magnesium alloy and copper alloy, magnesium alloy and carbon fiber reinforced plastic, and magnesium alloy and glass fiber reinforced plastic, the first and the second in each combination being the material for the first member 1 and the second member 2, respectively.

The joining device 4 includes a joining rotating tool 5 that rotates around a central axis thereof and an annular clamp ring 6 surrounding the joining rotating tool 5. For the convenience of description, it is assumed that the central axis of the joining rotating tool 5 extends vertically, and the second member 2 is placed on a horizontal surface of a worktable. In actual operation, other orientations are possible. For instance, the central axis of the joining rotating tool 5 may be angled relatively to the vertical direction, may extend laterally or may even be vertically inverted.

The joining rotating tool 5 has a rotationally symmetric shape around the central axis thereof. The joining rotating tool 5 includes a main body 7 having a substantially cylindrical shape centered around the central axis, and a probe 8 or a pin-like projection extending downward from the lower end of the main body 7 in a coaxial relationship. The probe 8 has a smaller diameter than the main body 7 so that an annular shoulder surface 9 is defined at the base end of the probe 8. The annular shoulder surface 9 is provided with a concave profile, but may also be flat. The outer periphery of the probe 8 is formed with a screw thread.

The clamp ring 6 has a substantially circular outer profile, and is provided with a through hole 10 extending along the central axis thereof. The upper end of the clamp ring 6 is provided with a radial flange 11 extending radially outward. The lower surface of the clamp ring 6 serves as a contact surface 12 that abuts against the upper surface of the first member 1 at the time of friction stir welding.

Figure 1B:
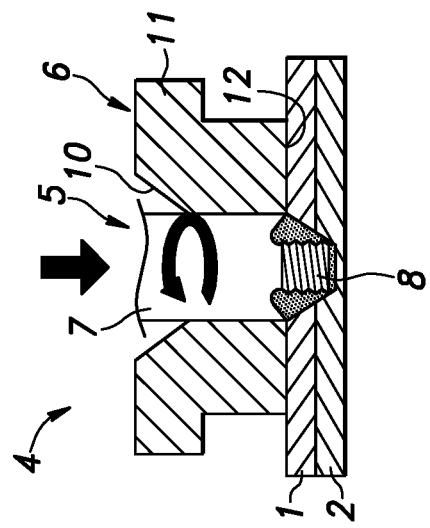
FIG. 1B is a diagram illustrating another stage in the process of joining two members by friction stir welding at a single spot.
Figure 1C:
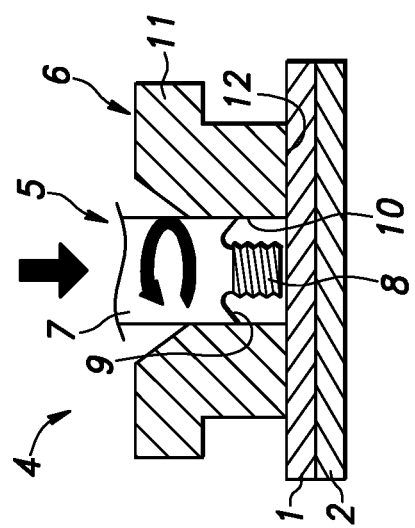
FIG. 1C is a diagram illustrating yet another stage in the process of joining two members by friction stir welding at a single spot.

The first member 1 and the second member 2 can be joined together by friction stir welding by using the joining device 4 as described in the following. As shown in FIG. 1A, the worker places the second member 2 on the worktable (not shown in the drawings), and the first member 1 on top of the second member 2 in an overlying relationship, and places the clamp ring 6 on top of the first member 1 so as to surround the region where the bonded part 3 is desired to be formed. While pressing the contact surface 12 of the clamp ring 6 against the first member 1, the joining rotating tool 5 is rotated, and passed through the through hole 10 of the clamp ring 6 as shown in FIG. 1B. The joining rotating tool 5 is pushed downward so that the probe 8 is pushed into the material of the first member 1. At this time, due to the rotation of the joining rotating tool 5, frictional heat is generated between the joining rotating tool 5 and the material of the first member 1, and causes the material of the first member 1 to plastically flow. Some of the material of the second member 2 may also plastically flow. The screw thread on the probe 8 is oriented such that the material of the first member 1 is displaced upward as the probe 8 is rotated. As a result, the plasticized material of the first member 1 (possible with the material of the second member 2) flows into the tubular cavity defined the inner circumferential surface of the through hole 10, the shoulder surface 9 and the outer peripheral surface of the probe 8. Then, the joining rotating tool 5 is lifted vertically upward out of the through hole 10 of the clamp ring 6. As a result, the bonded part 3 consisting at least mostly of the material of the first member 1 (possibly with a small amount of the material of the second member 2) is formed at a part where the plastic flow has taken place, and solidifies. FIG. 1C shows the bonded part 3 having a crater-shaped depression surrounded by an uplifted rim which is formed by the plasticized material displaced into the cavity defined by the inner circumferential surface of the through hole 10, the shoulder surface 9 and the outer peripheral surface of the probe 8. This rim is typically higher than the original upper surface of the first member 1, and the bottom of the depression is located between the upper surface and the lower surface of the second member 2.

Alternatively, the first and second members 1 and 2 are joined to each other without using the clamp ring 6. Further, the probe 8 may not have a screw thread on the peripheral surface thereof. In such a case, the rotational direction of the joining rotating tool 5 may be either clockwise or counterclockwise.

FIG. 2 shows a process of separating the first member 1 and the second member 2 (which were joined by friction stir welding) by using a separating device 13 according to a first embodiment of the present invention. The separating device 13 includes a clamp ring 14 and a separating rotating tool 15 that rotates around the central axis thereof. The clamp ring 14 and the separating rotating tool 15 shown here are similar in structure to the counterparts thereof shown in FIG. 1 so that the features of the clamp ring 14 and the separating rotating tool 15 different from those of the counterparts shown in FIG. 1 are primarily described in the following.

The diameter of the through hole 10 in the clamp ring 14 is equal to or slightly larger than the diameter of the through hole 10 of the clamp ring 6 shown in FIG. 1. It is possible to use the clamp ring 6 shown in FIG. 1 in this process.

The separating rotating tool 15 includes a main body 16 and a probe 17 extending downward from the lower end of the main body 16 along the central axis. The probe 17 has a smaller diameter than the main body 16, and a screw thread is formed on the outer peripheral surface of the probe 17. The shoulder surface 18 defined in the main body 16 at the base of the probe 17 is flat. The probe 17 has a slightly larger outer diameter than the probe 8 shown in FIG. 1, and is slightly longer than the probe 8 shown in FIG. 1.

Figure 2A:
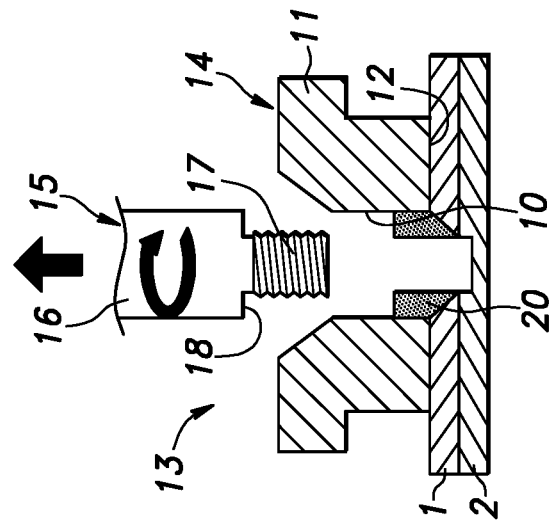
FIG. 2A is a diagram similar to that of FIG. 1A showing a stage of the process of separating the two members which were previously joined to each other away from each other.
Figure 2B:
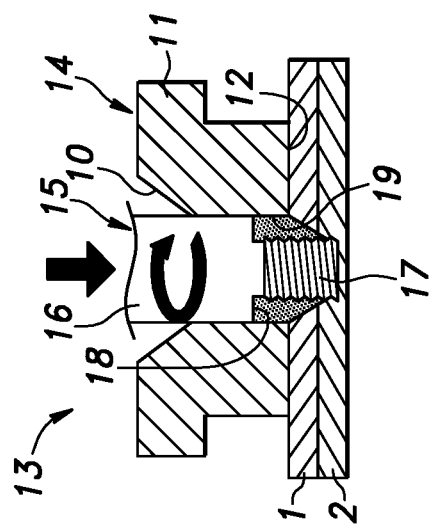
FIG. 2B is a diagram showing another stage of the process of separating the two members which were previously joined to each other away from each other.
Figure 2C:
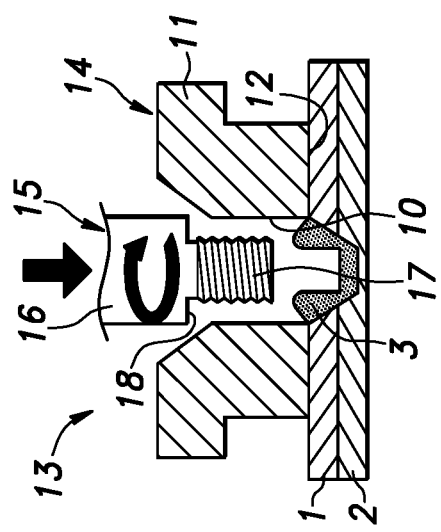
FIG. 2C is a diagram showing yet another stage of the process of separating the two members which were previously joined to each other away from each other.

The first member 1 and the second member 2 can be separated from each other by using the separating device 13 as described in the following. As shown in FIG. 2A, the worker puts the first and second members 1 and 2 which are joined to each other as described earlier on the worktable (not shown in the drawings) such that the first member 1 is placed on top of the second member 2 in an overlying relationship. The clamp ring 14 is placed on the first member 1 with the contact surface 12 thereof abutting against the upper surface of the first member 1 so as to surround the bonded part 3. Then, the separating rotating tool 15 is passed downward through the through hole 10 of the clamp ring 14 as shown in FIG. 2B, and the probe 17 is pushed into the bonded part 3 while the separating rotating tool 15 is rotated. As a result, the material of the bonded part 3 is plastically stirred owing to the frictional heat generated by the rotation of the probe 17. At this time, the rotating direction of the separating rotating tool 15 is such that the material of the bonded part 3 is plastically displaced upward owing to the screw thread. The probe 17 is plunged into the bonded part 3 until the lower tip thereof reaches a point located between the upper and lower surfaces of the second member 2. Once the probe 17 has reached a certain depth in the second member 2, and the material of the part of the bonded part 3 below the lower surface of the first member 1 (or the upper surface of the second member 2) has been plastically displaced upward beyond the upper surface of the second member 2, the plastically displaced material is pushed into a tubular cavity 19 (annular cavity) defined around the probe 17 in cooperation with the shoulder surface 18 and the inner circumferential surface of the through hole 10. Then, the separating rotating tool 15 is pulled out of the through hole 10 of the clamp ring 14 as shown in FIG. 2C. As a result, the plastically stirred part of the material of the first member 1 solidifies into a tubular projection that projects upward from the upper surface of the first member 1, and a dent or a recess is formed on the upper surface of the second member 2 so as to align with the central bore of the tubular projection. Thus, this tubular projection has an inner bore which opens out at the upper end thereof and communicates with the dent formed in the second member 2 at the lower end thereof. At this time, the part of the bonded part 3 consisting of the material of the first member 1 is substantially displaced away from the first member 1, and is converted into the tubular projection. As a result, the bonding between the first member 1 and the second member 2 is substantially lost, and the two members can be separated from each other with a relatively small force, FIG. 3 shows a process of rejoining the first member 1 and the second member 2 (which were separated from each other as described earlier with reference to FIG. 2) by using a rejoining device 21. The rejoining device 21 includes a clamp ring 22 and a rejoining rotating tool 23 that rotates around the central axis. The clamp ring 22 and the rejoining rotating tool 23 shown here are similar in structure to the counterparts thereof shown in FIG. 1 so that the features of the clamp ring 22 and the rejoining rotating tool 23 different from those of the counterparts shown in FIG. 1 are primarily described in the following.

The clamp ring 22 includes a through hole 10 and a contact surface 12 similarly to the clamp ring 14 shown in FIG. 2, and the diameter of the through hole 10 of the clamp ring 22 may be equal to or slightly greater than that of the clamp ring 14 shown in FIG. 2. Therefore, the same clamp ring may be used for both separation (FIG. 2) and rejoining (FIG. 3).

The rejoining rotating tool 23 includes a main body 7 and a probe 8. Since the probe 8 has a substantially smaller diameter than the main body 7, an annular shoulder surface 9 is defined in the main body 16 at the base of the probe 17.

The shoulder surface 9 in this case is provided with a concave shape. The shoulder surface 9 may also be flat. The projecting length of the probe 8 for rejoining is smaller than that of the probe 17 for separation. The diameter of the probe 8 for rejoining is equal to or smaller than that of the probe 17 for separation. However, the joining rotating tool 5 for bonding (FIG. 1) may be used also as the rejoining rotating tool 23 for rejoining (FIG. 3).

A process for rejoining the two members that were separated from each other by the process shown in FIG. 2 will be described in the following with reference to FIG. 3. As shown in FIG. 3A, the worker places the second member 2 on the worktable (not shown in the drawings), and the first member 1 on the second member 2 in an overlying relationship in the same relative position as when these two members were joined to each other according to the process shown in FIG. 1. The contact surface 12 of the clamp ring 22 is pressed against the first member 1, and as shown in FIG. 3B, the rejoining rotating tool 23 is passed downward through the through hole 10 of the clamp ring 22, and rotated around the central axis thereof. The rejoining rotating tool 23 is pushed downward until the tip of the probe 8 comes below the interface between the first member 1 and the second member 2. As a result, the tubular projection which was formed during the process of separating is pressed downward. This tubular projection will be referred to as a lifted part 20 hereinafter. At this time, the rotating direction of the rejoining rotating tool 23 is such that material of the lifted part 20 as well as the surrounding material is plastically fluidized by the frictional heat generated by the rotation of the rejoining rotating tool 23, and pushed downward. In particular, during the downward movement of the rejoining rotating tool 23, the shoulder surface 9 abuts against the lifted part 20, and pushes the plastically fluidized material of the lifted part 20 downward. As a result, the lifted part 20 is pressed downward, and fills the gap defined by the upper surface of the first member 1, the shoulder surface 9 of the rejoining rotating tool 23, the outer periphery of the probe 8 and the surrounding part of the first member 1 and the second member 2. As shown in FIG. 3C, when the operator pulls out the rejoining rotating tool 23, the portion that has plastically flowed solidifies and becomes a bonded part 3. In an alternate embodiment, the probe 8 used at the time of rejoining does not have a screw thread on the outer peripheral surface, and has a smooth or coarse outer peripheral surface. In this case, the rotating direction of the rejoining rotating tool 23 may be either clockwise or counterclockwise. If desired, before applying the rejoining rotating tool 23, additional material may be added to the lifted part 20 so as to form a part of bonded part 3 upon completion of the rejoining process.

The advantages of the process of separating the two members illustrated in FIG. 2 will be discussed in the following. The separating rotating tool 15 pushes the bonded part 3 upward around the probe 17 and forms into a tubular projection filling the gap between the shoulder surface 18 and the upper surface of the first member 1. As a result, the bonded part 3 is in most part pushed out of the interface region between the first member 1 and the second member 2 so that the bonding between the first member 1 and the second member 2 is significantly weakened. Therefore, upon completion of the process shown in FIG. 2, the two members can be still attached to each other, but can be readily separated from each other by applying a relatively small force.

Also, since the bonded part 3 is formed into the tubular projection projecting upward from the upper surface of the first member 1 in the separating process shown in FIG. 2, no part of the bonded part 3 or the material of the first member 1 and the second member 2 is required to be removed. As a result, no debris is created by this separating process.

During the separating process shown in FIG. 2 or the rejoining process shown in FIG. 3, the frictional heat generated by the separating rotating tool 15 is not significantly different to that generated during the joining process based on friction stir welding, any thermal adverse effect on the surrounding part of the first member 1 and the second member 2 is minimal so that the two members can be reused or bonded back together without any problem.

Various components of the separating device and the rejoining device are mostly common to those of the joining device. Therefore, no large investment is required for converting the joining device into the separating device and the rejoining device.

By using a comparatively deformable material for the first member as compared to the second member, the material of the first member 1 can be readily plasticized so that the joining process, the separating process and the rejoining process can be performed in a favorable manner with a relatively small energy consumption (for the pressure and the torque of the rotating tools).

Figure 5A:
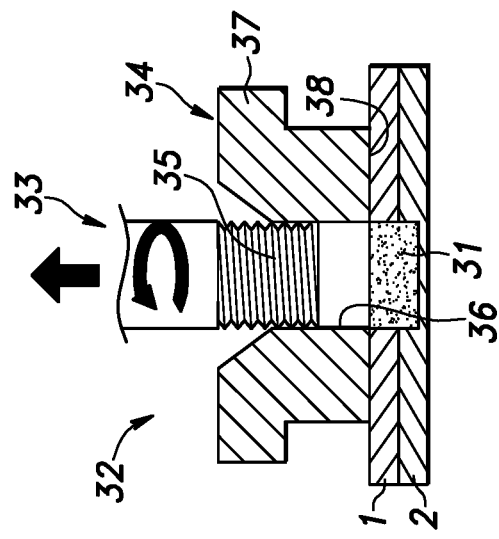
FIG. 5A is a diagram similar to that of FIG. 1A showing a stage of the process of joining the two members along the line.
Figure 5B:
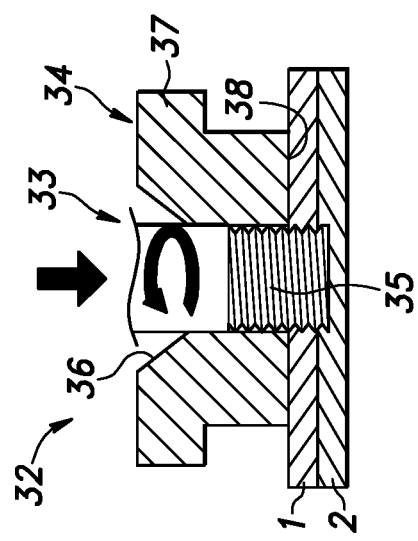
FIG. 5B is a diagram showing another stage of the process of joining the two members along the line.
Figure 5C:
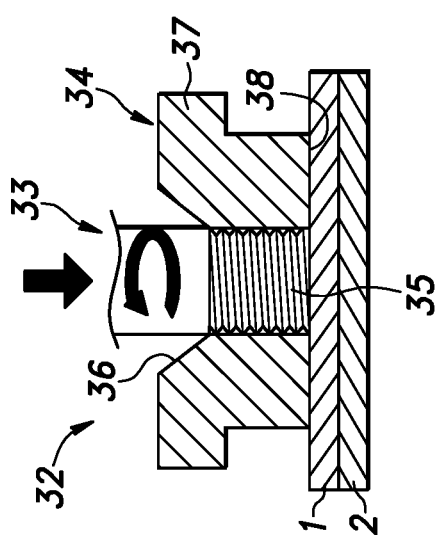
FIG. 5C is a diagram showing yet another stage of the process of joining the two members along the line.
Figure 6:
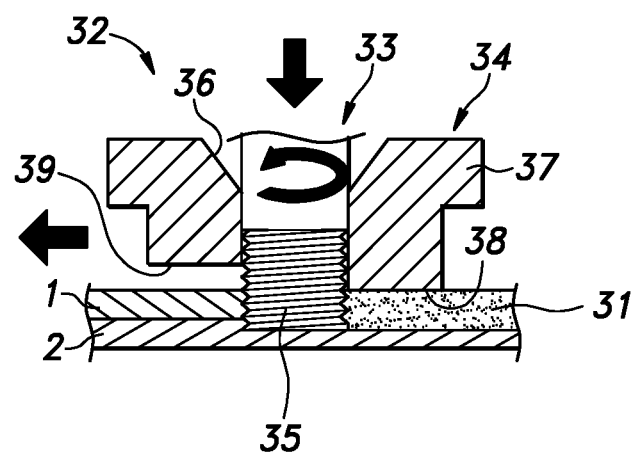
FIG. 6 is a diagram showing the process of joining the two members along the line as seen from a direction 90 degrees different from that for the diagram of FIG. 5.

FIGS. 4 to 6 show a process of joining two members to each other along a line by friction stir welding by using a joining device 32. FIG. 4 shows a bonded part 31 extending linearly on the surface of the first member 1. FIG. 5 shows a sectional view taken along line A-A of FIG. 4, and FIG. 6 shows a sectional view taken along line B-B of FIG. 4, when the joining process is in progress.

In this case, the first member 1 and the second member 2 are joined to each other along a line, but three or more members may be similarly joined together as long as the members excluding the lowermost member have relatively small thicknesses. Preferably, the material of the first member 1 is more readily deformable than that of the second member 2.

The joining device 32 uses a joining rotating tool 33, and a clamp ring 34 which are similar in structure to those of the preceding embodiment, and the following discussion will be directed to the features thereof that are different from the previously described rotating tools and clamp rings.

The joining rotating tool 33 is generally cylindrical in shape, and is provided with a probe 35 at the lower end thereof as a threaded part. The probe 35 may have a substantially same outer diameter as the remaining part of the joining rotating tool 33, but may also be smaller or larger in diameter than the remaining part of the joining rotating tool 33.

Figure 10:
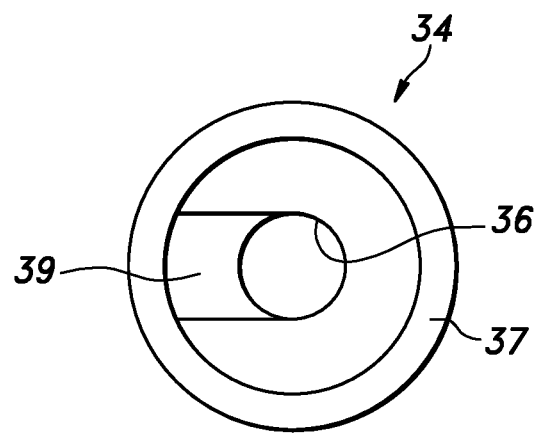
FIG. 10 is a bottom view of a clamp ring that can be used for the processes illustrated in FIGS. 4 to 9.

The clamp ring 34 has a substantially cylindrical shape, and is provided with a through hole 36 extending along the central axis thereof, and a radial flange 37 extending radially outward in an upper end part thereof. The lower surface of the clamp ring 34 is a contact surface 28 that abuts against the upper surface of the first member 1. The probe 35 is passed downward into the through hole 36. The probe 35 is closely received in the through hole 36, but can freely rotate relative to the clamp ring 34. As shown in FIG. 6 and FIG. 10, a radial groove 39 extends in the contact surface 28 radially outward from the through hole 36. The radial groove 39 has a substantially same width as the inner diameter of the through hole 36.

With reference to FIGS. 5 and 6, the process of joining the first member 1 to the second member 2 by friction stir welding by using the joining device 32 will be described. As shown in FIG. 5A, the worker places the second member 2 on the worktable, and then places the first member 1 on the second member 2 in an overlying relationship. The clamp ring 34 is placed on the first member 1, and the contact surface 38 is pressed onto the upper surface of the first member 1. Then, as shown in FIG. 5B, the probe 35 is rotated around the central axis thereof, and pushed against the upper surface of the first member 1 via the through hole 36 of the clamp ring 34. As the material under the probe 35 softens and becomes plastically deformable owing to the frictional heat, the probe 35 is plunged into the material of the first member 1 as shown in FIG. 5B. At this time, the rotational direction of the joining rotating tool 33 is such that the material of the first member 1 and the second member 2 that has become plastically fluid is pushed downward by the thread on the probe 35. The probe 35 is pushed downward until the lower end of the probe 35 reaches a point between the upper surface and the lower surface of the second member 2.

Thereafter, as shown in FIG. 6, the probe 35 along with the clamp ring 34 is moved linearly along the major plane of the first member 1 to form the bonded part 31 illustrated in FIG. 4. At this time, the groove 39 of the clamp ring 34 is positioned at the head of the moving direction of the clamp ring 34 and the probe 35 so that the plastically fluid part of the material of the first member 1 and the second member 2 is formed in the groove 39 and around the probe 35, and forced to the rear of the probe 35 and under the clamp ring 34. Once the clamp ring 34 and the probe 35 have reached the end point of the bonded part 31, the probe 35 is brought to a stop to the linear movement thereof, and is pulled upward out of the through hole 36 as shown in FIG. 5C. The plastically fluid part of the material on the trailing side of the probe 35 quickly solidifies as the probe 35 moves ahead, and forms the bonded part 31 having a linear configuration.

Figure 7A:
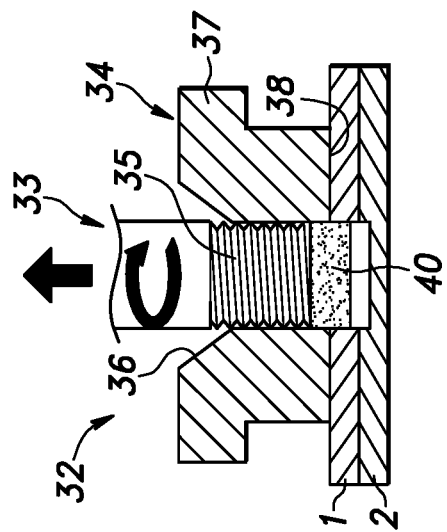
FIG. 7A is a diagram similar to that of FIG. 1A showing a stage of the process of separating the two members which were previously joined to each other along the line.
Figure 7B:
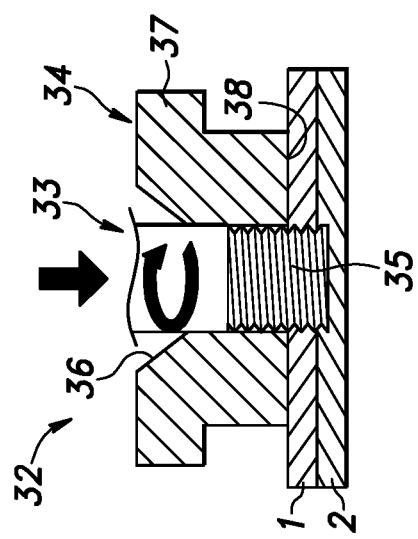
FIG. 7B is a diagram showing another stage of the process of separating the two members which were previously joined to each other along the line.
Figure 7C:
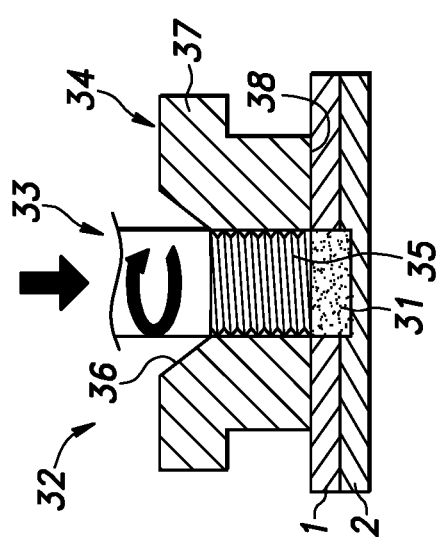
FIG. 7C is a diagram showing yet another stage of the process of separating the two members which were previously joined to each other along the line.
Figure 8:
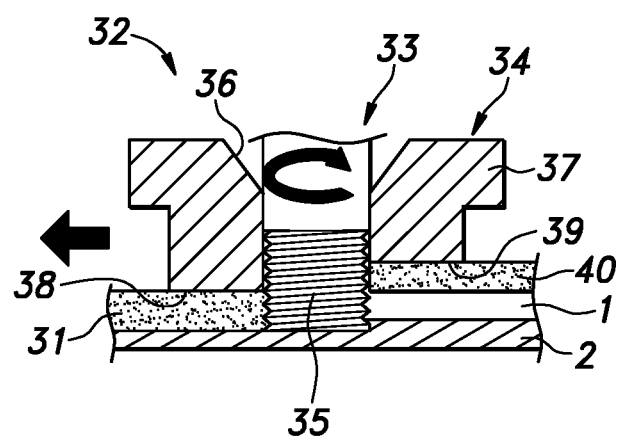
FIG. 8 is a diagram showing the process of separating the two members which were previously joined to each other along the line as seen from a direction 90 degrees different from that for the diagram of FIG. 7A.

FIGS. 7 and 8 show a process of separating the first member 1 and the second member 2 (which were joined by friction stir welding along a line as shown in FIGS. 5 and 6) by using a separating device 32 according to a second embodiment of the present invention. The separating device 32 includes a clamp ring 34 and a separating rotating tool 33 that rotates around the central axis thereof. The clamp ring 34 and the rotating tool 33 are similar in structure to the counterparts thereof shown in FIGS. 5 and 6 so that the features of the clamp ring 34 and the rotating tool 33 different from those of the counterparts shown in FIGS. 5 and 6 are primarily described in the following. First, the worker places the first member 1 and the second member 2 on a worktable (not shown in the drawings) with the first member 1 attached to the second member 2 along the bonded part 31 by the process illustrated in FIGS. 5 and 6. As shown in FIG. 7A, the contact surface 38 of the clamp ring 34 is pressed against the surface of the first member 1. At this time, the clamp ring 34 is oriented such that the groove 39 is located on the trailing side of the through hole 36 with respect to the direction of the linear movement of the separating rotating tool 33 along the major plane of the first member 1 and along the bonded part 31.

Then, the probe 35 is passed downward through the through hole 36, and plunged into the material of the bonded part 31 as shown in FIG. 7B. The separating rotating tool 33 is moved along the length of the bonded part 31. The separating rotating tool 33 is now rotated in the opposite direction from that of the joining rotating tool 33 as the separating rotating tool 33 is moved along the length of the bonded part 31. As a result, the material of the bonded part 31 is made plastically fluid, and pushed upward by the thread on the probe 35. Since the probe 35 is relatively closely surrounded by the inner wall surface of the through hole 36, the plastically fluid material of the bonded part 31 is pushed into the groove 39 while being lifted away from the first member 1. The lower end of the probe 35 at this time is located between the upper surface and the lower surface of the first member 1. The part of the material of the bonded part 31 which is pushed upward away from the first member 1 forms a lifted part 40 which is solidified, and attached to the first member 1, but substantially detached from the second member 2. Once the probe 35 reaches the other end of the bonded part 31, the separating rotating tool 33 is lifted upward away from the first member 1 and the second member 2, and the clamp ring 34 is removed. Since the bonded part 31 is converted into the lifted part 40 which is substantially detached from the second member 2, the first member 1 and the second member 2 can be separated from each other with a very little force.

Figure 9:
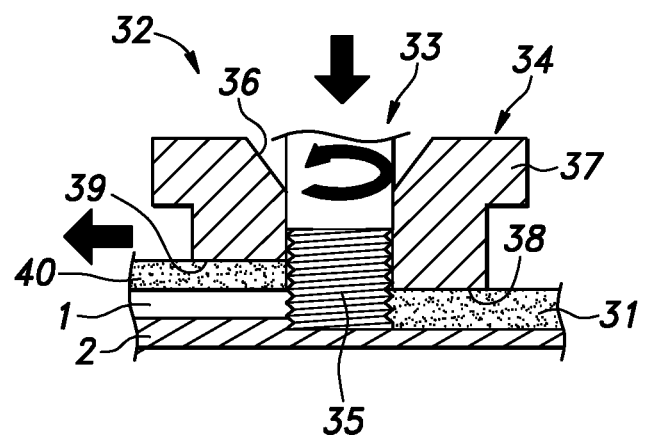
FIG. 9 is a diagram similar to that of FIG. 8 showing the process of rejoining the two members which were previously separated from each other along the line.

FIG. 9 illustrates the process of rejoining the first member 1 and the second member 2 that were separated from each other by the process illustrated in FIGS. 7 and 8. The worker places the second member 2 on the worktable, and positions the first member 1 on the second member 2 as they were located to each other when they were originally joined to each other. The clamp ring 34 and the rejoining rotating tool 33 are placed on an end point of the lifted part 40 (which was originally the bonded part 31 when the two members were joined to each other). While the rejoining rotating tool 33 is being rotated, the probe 35 is pushed into the lifted part 40. The rotating direction of the probe 35 is such that the material of the lifted part 40 which has become plastically fluid is pushed downward.

The groove 39 of the clamp ring 34 is at this time positioned at the front end of the rejoining rotating tool 33. Therefore, as the rejoining rotating tool 33 is moved along the length of the lifted part 40, the material of the lifted part 40 is initially received by the groove 39, and pushed downward by the rotating probe 35. As a result, the lifted part 40 is collapsed down by the probe 35, and kept pressed down by the contact surface 38. Once the rejoining rotating tool 33 reaches the other end of the lifted part 40, the rejoining rotating tool 33 is raised out of the through hole 36, and the clamp ring 34 is removed. Thus, the lifted part 40 is fully converted into the bonded part 31 which firmly joins the first member 1 to the second member 2.

Various components of the separating device and the rejoining device are mostly common to those of the joining device in regard to separating and rejoining along a line. Therefore, no large investment is required for converting the joining device into the separating device and the rejoining device. During the process of separating the first member 1 and the second member 2 illustrated in FIGS. 7 and 8, the bonded part 31 is substantially entirely converted into the lifted part 40 so that no debris is created, and no subsequent cleaning work is required. Also, upon completion of the separating process illustrated in FIGS. 7 and 8, the bonded part 31 is formed into the lifted part 40 which is lifted from the upper surface of the first member 1, and the first member 1 and the second member 2 are only weakly connected to each other so that the two members can be separated from each other with ease. When rejoining the two members that were separated from each other by the separating process illustrated in FIGS. 7 and 8, no material is required to be added so that the rejoining process can be simplified. Again, the thermal influences on the two members during the separating process and the rejoining process are so limited that the material properties of the first member 1 and the second member 2 are prevented from being altered by the separating process and the rejoining process.

Figure 11A:
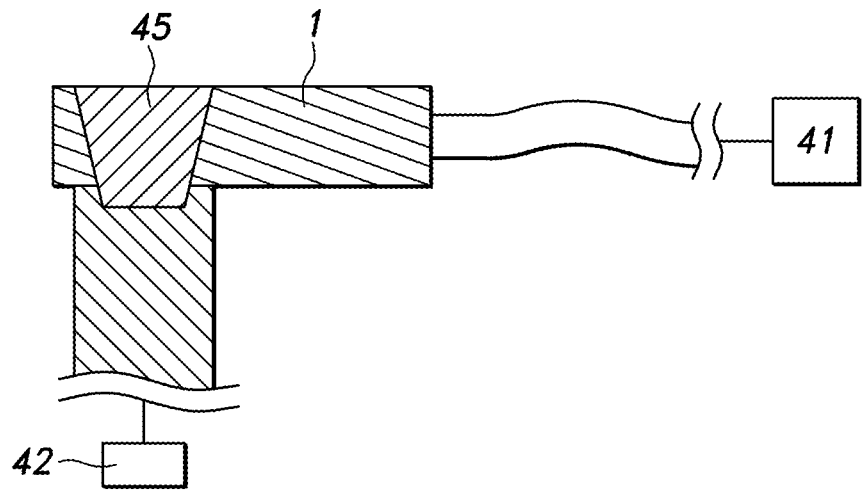
FIG. 11A is a diagram showing a stage of the process of joining and separating a lead terminal to and from a battery terminal.

FIG. 11 shows a third embodiment of the present invention as applied to a battery terminal. FIG. 11A shows a lead terminal 41 of an electric device 43 that requires a supply of electric power or supplies electric power for recharging, and a columnar battery terminal 42 of a battery 44. The lead terminal 41 is joined to the top end of the battery terminal 42 by a bonded part 45 by the process illustrated in FIG. 1. The bonded part 45 is mostly formed by the material of the lead terminal 41, but a small amount of the material of the battery terminal 42 is also plastically displaced so as to form a part of the bonded part 45. Thus, the bonded part 45 extends into the battery terminal 42.

Figure 11B:
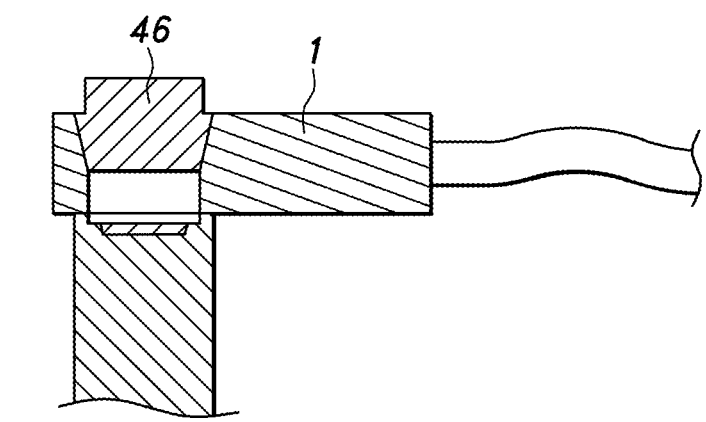
FIG. 11B is a diagram showing another stage of the process of joining and separating a lead terminal to and from a battery terminal and FIG. 11C is a diagram showing yet another stage of the process of joining and separating a lead terminal to and from a battery terminal.

FIG. 11B shows the result of the separating process performed on the lead terminal 41 and the battery terminal 42 which were originally joined to each other as shown in FIG. 11A. The probe of the separating rotating tool not shown in the drawings has mostly lifted up the material of the bonded part 45 so that the bonded part 45 is turned into a lifted part 46. However, in this case, the shoulder surface of the joining rotating tool is flat so that the top end of the bonded part 45 is raised above the upper surface of the surrounding part of the lead terminal 41, but is substantially flat.

Figure 11C:
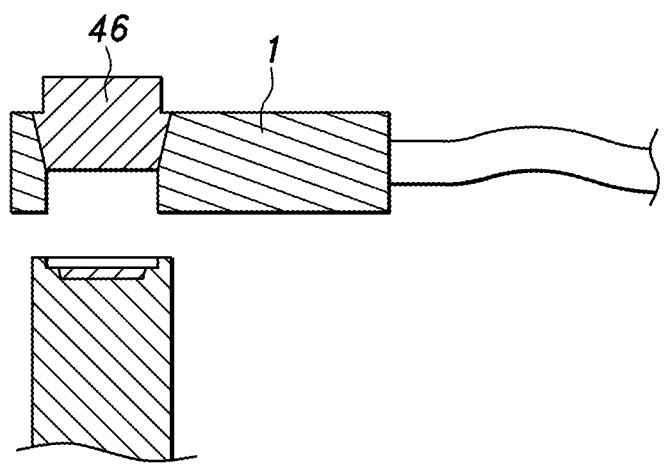

Following the separating process, there is a gap between the upper surface of the battery terminal 42 and the lower surface of the lifted part 46 so that the lead terminal 41 can be readily removed from the battery terminal 42 as shown in FIG. 11C. At this time, a small dent may be created on the surface of the battery terminal 42, and a small amount of the bonded part 45 may be left on the upper surface of the small dent.

If desired, the lead terminal 41 and the battery terminal 42 which were separated from each other as shown in FIG. 11C may be rejoined by the process illustrated in FIG. 3. In this case, by using a suitable tool set, the lifted part 46 is pushed downward into the gap defined between the upper surface of the battery terminal 42 and the lower surface of the lifted part 46 until this gap is substantially filled by the material of the lifted part 46 to form the bonded part 45 once again. This embodiment also provides at least most of the advantages provided by the first embodiment and the second embodiment.

The present invention has been described in terms of specific embodiments, but the present invention is not limited by the illustrated embodiments, and can be altered and substituted in various ways without departing from the spirit of the present invention. For instance, the separating process and rejoining process according to the present invention are applicable to cases where the relevant members were originally joined to each other by methods other than friction stir welding, such as laser welding, electric spot welding, arc welding and bonding using chemical agents, among other possibilities. The separating process and rejoining process according to the present invention can be widely used for servicing, maintaining and recycling various devices.

The invention claimed is:

1. A method for separating a first member and a second member joined to each other at a bonded part away from each other, comprising the steps of:
   placing the first member and the second member on a worktable with the first member facing away from the worktable;
   placing a clamp ring on the surface of the first member, the clamp ring having a contact surface abutting against the surface of the first member and a through hole extending through the contact surface such that the through hole of the clamp ring aligns with the bonded part;
   plunging a separating rotating tool including a probe having a screw thread on a peripheral surface thereof into the surface of the first member through the through hole of the clamp ring, the screw thread being directed so as to lift material of at least a part of the bonded part away from the second member as a lifted part;
   lifting the probe along with the clamp ring away from the surface of the first member; and
   separating the first member and the second member away from each other,
   wherein the bonded part extends from a start point to an end point along the surface of the first member, the method further comprising the step of moving the clamp ring and the probe along the bonded part from one of the ends thereof to the other after the step of plunging the rotating probe and before the step of lifting the probe so as to convert the bonded part into a lifted part, the contact surface of the clamp ring being provided with a groove extending from the through hole to an outer periphery of the contact surface and oriented to a trailing direction with respect to movement of the clamp ring.

2. The method according to claim 1, further comprising the steps of:
   placing the second member on a worktable, and the first member on the second member in a closely overlying relationship and in a relative position as the two members were originally joined to each other;
   placing a clamp ring on the surface of the first member, the clamp ring having a contact surface abutting against the surface of the first member and a through hole extending orthogonally to the contact surface such that the through hole of the clamp ring aligns with one of the ends of the lifted part;
   plunging a rejoining rotating tool including a probe into the surface of the first member at one of the ends of the lifted part through the through hole of the clamp ring;
   moving the rotating probe along the lifted part so as to convert the lifted part into the bonded part until the other end of the lifted part is reached, the contact surface of the clamp ring being provided with a groove extending from the through hole to an outer periphery of the contact surface and oriented to a leading direction with respect to movement of the clamp ring; and
   lifting the probe along with the clamp ring away from the surface of the first member.

3. The method according to claim 2, wherein the rejoining rotating tool is plunged into the surface of the first member until a tip end of the probe extends beyond an interface between the first member and the second member.

4. The method according to claim 2, wherein the probe is provided with a screw thread on a peripheral surface thereof, the screw thread being directed so as to push the material of the lifted part toward the second member into a bonded part once again.

* * * * *